United States Patent Office 3,215,407
Patented Nov. 2, 1965

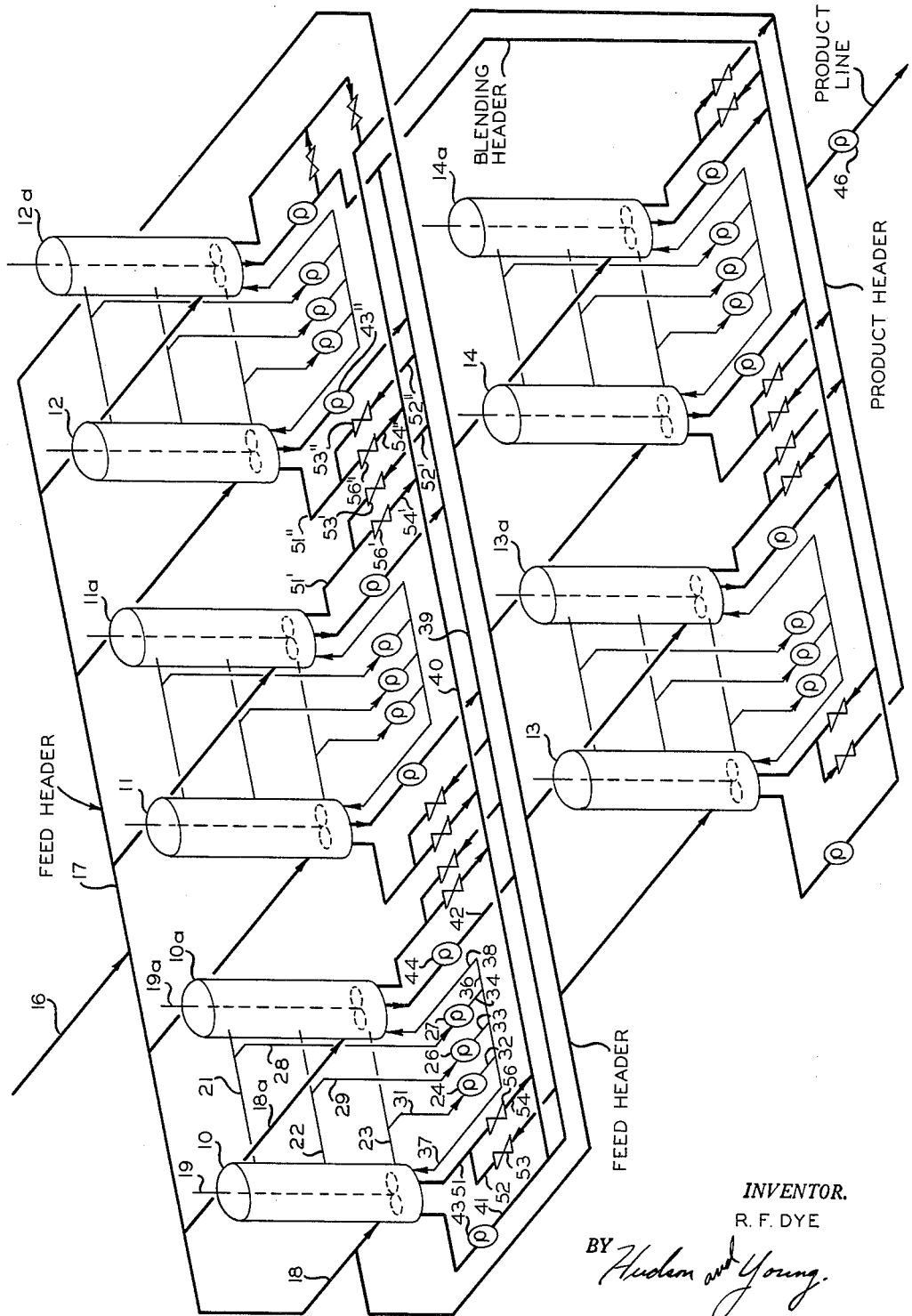

3,215,407
BLENDING APPARATUS
Robert F. Dye, Bartlesville, Okla., assignor to Phillips
Petroleum Company, a corporation of Delaware
Filed Dec. 19, 1960, Ser. No. 76,863
1 Claim. (Cl. 259—4)

This invention relates to a blending system.

In many chemical processes a reaction zone effluent varies in quantity per unit time and in the physical properties of the product. An example of such a system is the production of rubber wherein the polymerization zone effluent varies in quantity and the rubber varies in physical properties. To take care of differences in rate of production, surge zones have been used. The problem of differences in physical properties of the product has remained a more difficult one. Obviously, a product having substantially constant properties is desired although different properties may be desired at different times.

An object of this invention is to provide an improved storage system. A further object of this invention is to provide a method of an apparatus for blending viscous solutions.

Broadly, my invention resides in the production of polymers by the polymerization of monomers wherein a solution of said polymer in a solvent inert thereto is obtained as a product of the polymerization process, the polymer in said solution varying in a physical property, the improvement comprising serially filling a plurality of storage zones with polymerization zone effluent, determining the magnitude of said physical property of the polymer in each storage zone following filling thereof, blending solutions from at least two of said storage zones in amounts to provide a blend of said solutions of polymer in which the polymer in said blend has said physical property of a desired magnitude, and recovering said polymer from said blend.

As will be apparent hereafter, one such physical property which can be controlled is the Mooney viscosity of a rubbery polymer.

In another aspect, the invention resides in apparatus comprising a plurality of storage tanks, a feed header communicating with each of said storage tanks, a feed conduit communicating with said feed header, a blending header communicating with each of said storage tanks, a removal conduit communicating with said blending header, and mixing means to agitate material in each of said storage tanks.

This process and apparatus are suitable to the treatment of a wide variety of solutions of polymers.

In this system, it is possible to recover rubber from various types of rubber in solution. These rubbery polymers are prepared by polymerizing a monomer system containing a single monomer or a mixture containing at least a major portion of conjugated dienes containing 4 to 8 carbon atoms. Examples of conjugated dienes which can be used include 1,3-butadiene, isoprene, 2,3, dimethylbutadiene, 2-methoxybutadiene, 1,3-hexadiene, and 1,3-octadiene. These conjugated dienes can be polymerized either alone or in admixture with each other and/or with one or more other compounds containing an active $CH_2=C<$ group which are copolymerizable therewith. Suitable comonomers containing this group include styrene, acrylonitrile, methyl acrylate, methyl methacrylate, vinyl chloride, methyl vinyl ether, ethylene, propylene, 1-butene, 1-propene, 1-octene and the like. Preferably, at least 50 percent conjugated diene by weight is used in the monomer mixture when copolymers are prepared.

The polymers are prepared in the presence of organic solvents including paraffins, cycloparaffins and aromatic hydrocarbons which are relatively inert, non-deleterious and liquid under the conditions of the process. Examples include propane, butane, pentane, hexane, heptane, isooctane, cyclohexane, methylcyclohexane, benzene, toluene, and the like.

A large number of initiator systems are suitable for the production of the polymers.

One type of initiator system is a two or more component catalyst wherein one component is an organometal compound, including those where one or more organo groups is replaced by a halogen; a metal hydride; or a metal of Group I, II or III; and the second component is a Group IV to VI compound, e.g., salt or alcoholate. This type of initiator system is fully described with a group of examples in columns 5 through 8 of Patent No. 2,886,561 dated May 12, 1959.

Another initiator system which is suitable involves the use of a compound of the formula $R(Li)_x$, wherein R is a hydrocarbon radical selected from the group consisting of aliphatic, cycloaliphatic and aromatic radicals and combinations of these radicals and $x$ is an integer from 1 to 4, inclusive. The aliphatic and cycloaliphatic radicals can be saturated or contain olefinic unsaturation. The R in the formula has a valence equal to the integer, and preferably contains from 1 to 20, inclusive, carbon atoms, although it is within the scope of the invention to use higher molecular weight compounds. Examples of these compounds include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,4,6-tetralithiocyclohexane, 1,2,3,5-tetralithio-4-hexylanthracene, 1,3-dilithio-4-cyclohexene, and the like.

The amount of organolithium initiator employed can vary over a broad range. In general, the amount of initiator used will be in the range from 0.3 to 100 milliequivalents of lithium per 100 parts by weight of total monomers charged and will preferably be in the range from 0.6 to 15 milliequivalents of lithium per 100 parts by weight of total monomers charged. When n-butyllithium is employed as the initiator for the production of an easily processable 40 to 60 Mooney rubber (ML-4 at 212° F.), the quantity of initiator required will generally be in the range from 2 to 2.4 millimoles per 100 parts of total monomers charged.

Still another initiator system utilizes a cobalt compound and a metal alkyl wherein one but not all of the alkyl groups can be replaced by halogen. The Group III metals, as exemplified by aluminum, are used to provide the metal alkyl component. Examples of these organometal compounds include trialkylaluminums, such as triethylaluminum and triisobutylaluminum and alkyl aluminum halides, such as ethylaluminum dichloride and diethylaluminum chloride. For the cobalt compound, the cobaltous form is preferred. Examples of these compounds include cobaltous chloride, cobaltous sulfate, cobaltous nitrate, and the salts of organic acids, such as cobaltous acetate.

Some of the systems included within the above description have been found particularly suitable for the production of polymers having particular molecular configuration. For instance, polybutadiene having 85 to 100 percent of the polymer formed by cis 1,4-addition can be prepared using initiator systems comprising triisobutylaluminum and titanium tetraiodide; triisobutylaluminum, titanium tetrachloride, and iodine; and triisobutylaluminum, titanium tetraiodide and titanium tetrachloride. Polybutadiene having 70 to 100 percent of the polymer formed by trans 1,4-addition can be prepared using an initiator system comprising lithium aluminum hydride and titanium tetraiodide. The catalyst system comprising lithium aluminum hydride and titanium tetrachloride produces a polybutadiene having a major amount of the polymer formed by 1,2-addition. Similar products are obtained using isoprene except that a portion of the product can be formed by 3,4-addition.

In the recovery of polymers of the above type from solution, one method comprises concentrating the solution to approximately 10 to 25 percent solids. Thereafter, a steam stripping operation can be used for recovery of the rubbery polymer in crumb form.

My invention resides in treatment of the polymerization zone effluent or the solution obtained from the concentration step. The process of my invention can probably be best understood from the drawing. For convenience, valves and certain auxiliary apparatus are not shown in this drawing. The addition of such features would be obvious to one skilled in the art. The drawing shows a group of five pairs of vertical storage zones. Since each pair of storage zones is similar to each other pair and since the operation of each pair of zones is similar, a detailed description is given of only the first pair. These pairs of storage zones or tanks are identified as 10, 10a, 11, 11a, 12, 12a, 13, 13a, 14 and 14a. For best results, the tank should be comparatively tall when compared to the cross section area or diameter. More specifically, I prefer to use storage tanks which are upright cylinders having a height at least twice the diameter. A feed supply conduit 16 communicates with feed header 17. From said header 17, a supply conduit extends to each of the storage zones, the supply conduits extending to the first pair of storage zones being identified as 18 and 18a. Each storage zone is provided with an agitator 19 and 19a. Extending from each of the storage zones are product removal conduits 21, 22 and 23. Three such removal conduits are shown in the drawing but the operation is satisfactory as long as a plurality are used and, of course, more than three can be used. Roll pumps 24, 26 and 27 are provided, these communicating with removal conduits 21, 22 and 23 by conduits 28, 29 and 31, respectively. Conduits 32, 33 and 34 extend from the pumps to roll header 36 from which conduits 37 and 38 return to zones 10 and 10a, respectively.

A blending header 39 is provided, this communicating with zones 10 and 10a by conduits 41 and 42 which are provided with, respectively, blending pumps 43 and 44. Each tank is provided with a conduit 51 communicating therewith and with blending header 39 by means of conduit 52 having valve 53 therein and with product header 40 by means of conduit 54 having valve 56 therein. The corresponding elements for tank 11a are, for the purpose of showing the operation, identified at 51', 52', 53', 54' and 56' and for tank 12 as 51'', 52'', 53'', 54'', and 56''. Product header 40 connects with product line 45 having pump 46 therein for transfer of material to subsequent operations.

In the operation, the product is successively passed to the various storage zones. Thereafter, the material in the storage zone is agitated in order to maintain a uniform composition therein. The apparatus disclosed provides two methods of agitating the material in a single storage zone. In some cases, a simple impeller or other internal mixing device is satisfactory. In other cases, it is necessary to roll the tanks by taking material from a plurality of levels, passing it through a pump, and returning the pump material to the storage zone. After the composition in a tank is uniform, a sample is taken and the physical properties determined. When a particular product is desired, material can be drawn from a zone containing the material of the desired property or a mixture of materials from different storage zones can be used.

An alternate procedure is to blend from two tanks into a third. For example, when tank 11a is empty, portions of the material in tanks 10 and 12 can be blended in 11a. Pumps 43 and 43'' would pump material from the respective tanks. Valve 53' would be opened and proper flow would take place. When the blend in tank 11a is to be used, valve 56' would be opened and operation of pump 46 will cause material to flow through conduits 51', 54' and 40 to the product line. From this description, it will be noted that valves 53 and 56, and those corresponding thereto, are normally closed.

Mooney viscosity is one of these variables. When a certain type of rubber is being produced, the Mooney viscosity of the product will vary from about 20 to 90 (ML–4). The desired Mooney is usually in the range of 40 to 50. The relationship between the Mooney value of different products is linear. In other words, equal parts of a 15 percent solution of two different rubbers having, respectively, a Mooney value of 75 and 25 will, when blended, give a product having a Mooney of 50. These variations in Mooney viscosity occur over a period of time and are due to many factors including monomer and diluent feed purity, catalyst level and purity, temperature fluctuation, etc.

The following example illustrates specific operation according to the method of my invention while using the apparatus of my invention.

Example 1,3-butadiene was polymerized in the presence of triisobutylaluminum, titanium tetrachloride and iodine, to give a polymer formed by approximately 95 percent cis 1,4-addition in a continuous process. Sufficient toluene was used as a solvent to produce a polymerization zone effluent containing approximately 5 weight percent polybutadiene. Rosin acid was used to shortstop the polymerization and 2,2'-methylene bis(4-methyl-6-tertiarybutylphenol) was added as an antioxidant. Thereafter, the solution was concentrated to approximately 15 percent rubber solids by flashing off some of the toluene. In a particular plant 2000 barrel tanks were used, these tanks holding approximately 6 hours of production. Over a period of time, the viscosity of the 15 percent solution varies from 2000 to 50,000 centipoises and the Mooney of the rubber varies from 20 to 90 (ML–4). Such solutions can be thoroughly blended in such a tank in 4 hours using 100 H.P. mixers.

The Mooney of each tank is measured following complete mixing thereof and the products are subsequently blended to form a product of the desired Mooney, a straight line relationship being employed. In one run one tank contains rubber having a Mooney (ML–4 at 212° F.) of 64 and a second has a Mooney of 26 both at 15 percent rubber solids by weight. A product with a desired Mooney of 50 is obtained by mixing 58 pounds of the low Mooney material with each 100 pounds of the high Mooney stock.

Thereafter, the rubber of the desired Mooney is recovered from the solution by steam stripping.

As many possible embodiments can be made of this invention without departing from the scope thereof, it is to be understood that all matter herein set forth is to be interpreted as illustrative and not as unduly limiting the invention.

I claim:

Apparatus comprising a plurality of pairs of storage tanks, each pair of tanks including a first and second tank, a feed header communicating with each of said storage tanks, a feed conduit communicating with said feed header, a plurality of vertically spaced removal conduits extending from each said first and second tanks, a roll header communicating with an inlet in the lower end portion of each said tank, a plurality of conduits extending from each of said vertically spaced removal conduits to said roll header, a pump in each of said last-mentioned conduits, a blending header, a conduit extending from each tank to said blending header and an additional conduit extending from said blending header to each tank, said blending header and associated conduits permitting flow from any tank to any other tank, a product header, and a conduit extending from each tank to said product header.

References Cited by the Examiner
UNITED STATES PATENTS

| | | | |
|---|---|---|---|
| 781,406 | 1/05 | Devereux | 259—8 |
| 2,215,706 | 9/40 | Lewis | 259—8 |
| 2,459,761 | 1/49 | Palmer | 260—894 |
| 2,614,093 | 10/52 | Wheelock | 260—879 |
| 2,954,214 | 9/60 | Paulsen | 259—8 |
| 2,963,415 | 12/60 | MacDonald | 259—4 |
| 2,964,083 | 12/60 | Pfau et al. | 260—894 |
| 2,969,225 | 1/61 | Jenks | 259—4 |
| 2,971,951 | 2/61 | Cines | 260—95 |
| 3,060,989 | 10/62 | Railsback et al. | 260—894 |

MURRAY TILLMAN, *Primary Examiner.*
D. ARNOLD, L. J. BERCOVITZ, *Examiners.*